Sept. 2, 1952  R. F. HANSFORD  2,608,770
ROUTE-FINDING DEVICE
Filed Feb. 25, 1948  2 SHEETS—SHEET 1
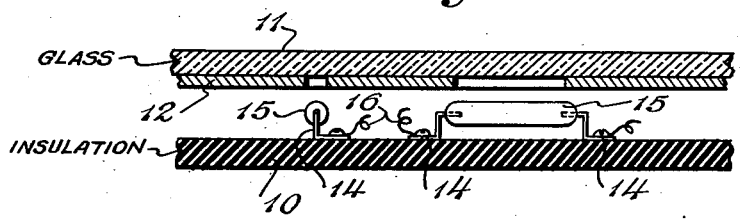
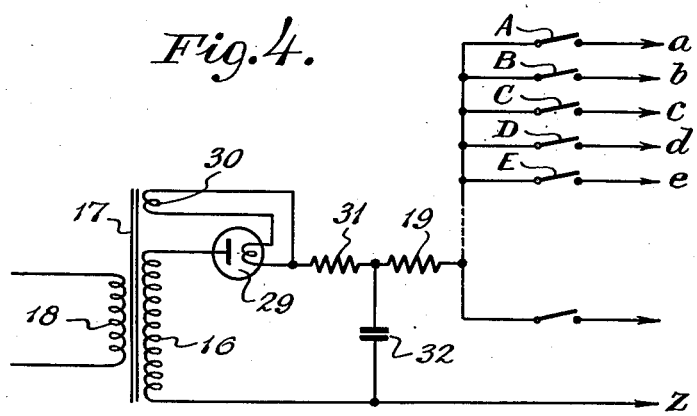
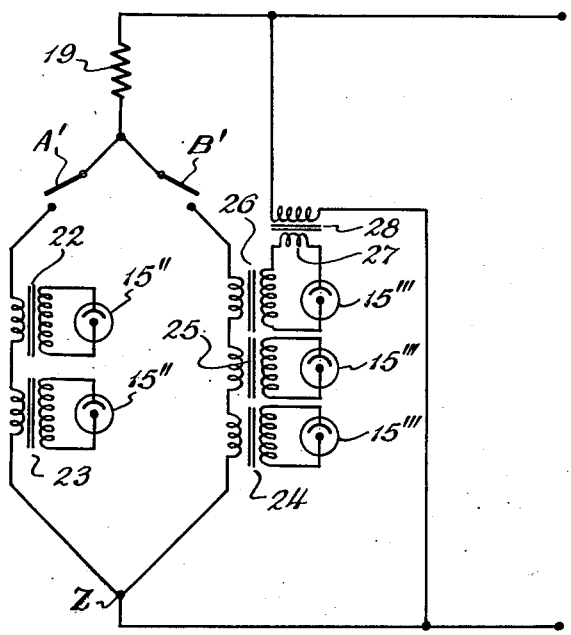
INVENTOR
REGINALD F. HANSFORD
BY
Herbert H. Thompson
his ATTORNEY Sept. 2, 1952  R. F. HANSFORD  2,608,770
ROUTE-FINDING DEVICE
Filed Feb. 25, 1948  2 SHEETS—SHEET 2

INVENTOR
REGINALD F. HANSFORD
BY
Herbert H. Thompson
HIS ATTORNEY

Patented Sept. 2, 1952

2,608,770

UNITED STATES PATENT OFFICE 2,608,770

ROUTE-FINDING DEVICE

Reginald Frederick Hansford, Bognor Regis, England, assignor to The Sperry Corporation, Great Neck, N. Y., a corporation of Delaware Application February 25, 1948, Serial No. 10,901
In Great Britain November 29, 1946

Section 1, Public Law 690, August 8, 1946
Patent expires November 29, 1966

4 Claims. (Cl. 35—40)

This invention relates to devices for finding and indicating the shortest route between any two points among a number that are interconnected by a maze of paths. It will be understood that the terms "points" and "paths" are used in a very general manner and the term "short" is also used in a generalised manner to embrace not only short in a geometrical sense as a measure of distance, but also to embrace the measurement of such matters as the time required to travel between any of the points along a certain route and the total resistance to the flow of a fluid or of electricity along a certain route.

According to the present invention a route finding device comprises a maze of channels interconnecting a plurality of points and having incorporated in, or coupled by means of an impedance-transforming device or devices into, each channel, one or more threshold devices, means for connecting to the maze at one of the points and at any selected other of the points input and output channels for a working agent, and throttling means in the input or output channel or in both.

The term "threshold device" is herein used to mean a device that prevents or greatly impedes the flow or operation of the working agent when the pressure or force to which the threshold device is subjected by the working agent is below a certain threshold value, but impedes the flow or operation of the working agent substantially less, only a little, or not at all, when the pressure or force to which it is subjected by the working agent is greater than the threshold value. The term "throttling means" is used to embrace any means that, in permitting the flow or operation of the working agent, degrades, dissipates or absorbs some portion of the pressure or force of the working agent. For example in the case of a fluid working agent the throttling means may be a constricted conduit or in the case of electricity it may be an impedance, such as a resistance for continuous-current electricity or a reactance for alternating-current electricity.

In the operation of the device, the total value of the pressure or force of the working agent that must be applied to the ends of any one route between two points in the maze in order that the working agent may flow or operate in that route (that is the total effective threshold value for the route) is the arithmetic sum of the individual threshold values that are effective in that route due to the individual threshold devices associated with it by direct incorporation in or by coupling into its channels. The working agent tends preferentially to flow or to operate in the shortest route between the two points, that is in that route between the two points for which the total effective threshold value is the lowest. The flow or operation of the working agent in this shortest route causes a degradation, dissipation or absorption of some of the pressure or force of the working agent in the throttling means, so that the resultant pressure or force difference between the two points is lower than any greater total threshold values of other routes that may exist between the two points. Consequently, the working agent will flow through or operate substantially exclusively in the route between the two points that has the smallest total effective threshold value. The threshold devices furthermore are preferably of such a nature that, the threshold having been exceeded and flow or operation of the working agent having been initiated, such flow or operation is permitted to continue relatively unimpeded until the pressure or force to which the threshold device is subject becomes appreciably lower than the threshold value of the pressure or force at which the flow or operation was initiated. If then there be a plurality of routes all having identical total effective threshold values lower than that of any other route, the particular route of the plurality in which the working agent flows or operates is determined at random. However, if desired, in any case in which a plurality of routes are normally of equal length and it is desired that one of these should be preferentially adopted, the threshold devices of that one route, or the threshold devices included in any particular channel of that route, may be given a lower threshold than the threshold devices in alternative routes of the plurality.

In carrying out the invention the threshold devices may be any devices such that the relationship between applied pressure or force and the permitted flow or operation of the working agent is not one of mutual proportionality and preferably, when shown in the form of a graph, has an abrupt knee or bend. If this knee or bend occurs at a value of pressure or force different from the desired threshold value for any particular threshold device, an auxiliary source of bias force or pressure may be associated with that threshold device to bring the working threshold of the combination to the required value of applied pressure or force.

In carrying out the invention in practice the working agent may be a fluid under pressure, in which case the channels interconnecting the points may be conduits or pipes, the threshold devices may be loaded, preferably spring-loaded valves and the throttling means may be a constricted conduit or nozzle or any device that causes a pressure drop when the fluid flows through it. Indication of the route may be afforded by the displacement of the valves included in the route or by any form of flow indicator. The working agent, a gas or liquid, may be supplied or circulated under pressure by any suitable form of pump.

It is preferred, however, to carry out the invention electrically, in which case the channels comprise electrical conductors and the threshold devices consist of any of a number of well known devices having a relation between impressed voltage and resultant current flow that is other than one of mutual proportionality, such as thermionic valve rectifiers or hot or cold cathode gas or vapor discharge tubes, if necessary combined each with a source of bias electromotive force to bring its effective threshold to the required value. In such case the throttling means comprises an electrical impedance, a resistance in the case of continuous current supply.

The invention is particularly applicable to finding and indicating the shortest available route from point to point upon telecommunication networks, railway systems, tramways systems and other communication systems involving mazelike networks. For the better understanding of the invention a railway route indicator incorporating it will now be described by way of example only with reference to the accompanying drawings, in which:

Fig. 1 is a typical part cross section of a preferred form of route indicating device in accordance with the invention;

Figure 2:
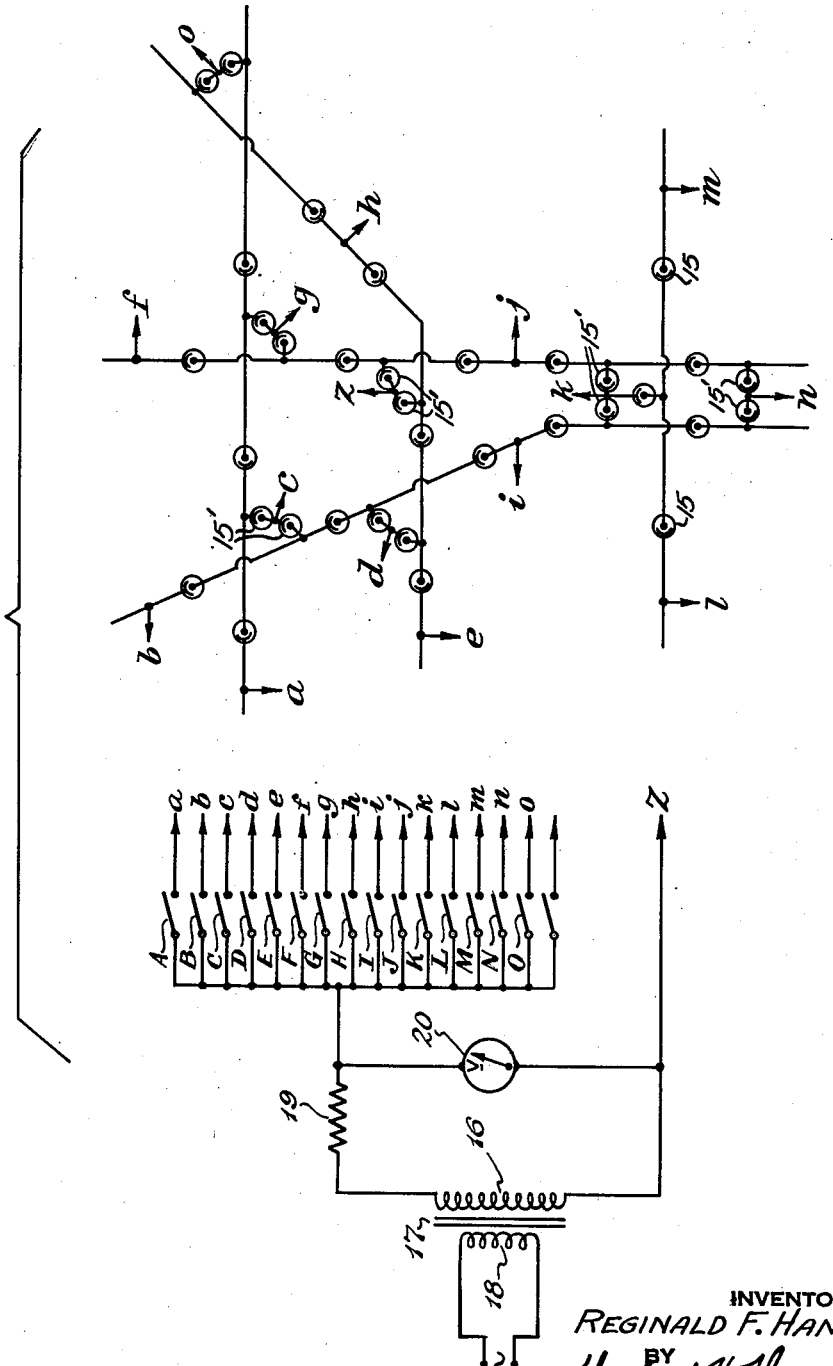
Fig. 2 is a schematic electrical diagram demonstrating the electrical circuits of a route indicating device in accordance with the invention.

Fig. 3 is an electrical circuit diagram showing a modification applied to two typical channels in which the threshold devices, instead of being directly incorporated in the channels of the maze, are coupled by means of impedance transforming devices into each channel; and Fig. 4 is a circuit diagram showing a modification of part of the electrical circuits demonstrated in Fig. 2 for the purpose of supplying power to the maze by means of continuous electric current instead of alternating electric current.

Like reference numerals are utilised to indicate like parts, where applicable, throughout the several figures of the accompanying drawings.

As shown in Fig. 1 the railway route indicator comprises a flat base 10, preferably of electrically insulating material, over which is mounted a cover 11 of transparent or translucent material, such as glass. An opaque sheet 12, of paper, card or even paint is arranged beneath the cover 11 and upon it is presented a display representing the whole railway network together with the points of interchange. Elongated openings or slots 13 are provided in the opaque sheet 12 in positions corresponding with the various branches of the railway network as displayed upon the sheet 12. Beneath the sheet 12 is arranged an electrical network, diagrammatically illustrated in Fig. 2 having neon glow lamps 15 disposed beneath the various openings or slots 13 so that they may be observed through the cover 11, and also beneath the representations of the various points of interchange on the railway network. These glow lamps 15 are preferably of elongated tubular form, as shown, and may be mounted by means of electrically conducting brackets 14 upon the base 10, if the latter is of electrically insulating material. The glow lamps 15 are preferably without ballast resistances, so that, once their ignition voltage is exceeded, the voltage across their terminals is substantially independent of the current that flows through them. Such glow lamps also have the property that their extinction voltage is lower than their ignition voltage.

Referring now to Fig. 2 which shows an electrical maze of channels interconnecting points $z$ and $a$ to $o$ inclusive corresponding respectively to stations of entrance and interchange of a particular railway network, the number of lamps 15 included in each channel of the electrical network is, as near as is practicable proportional to the average time of transit through the corresponding branch of the railway system. Thus there are, for example, two lamps 15 in the channel connecting the points $l$ and $m$ representing two units of transit time; and between the points $b$ and $i$ there are three lamps, representing three units of transit time. However at points $z$, $c$, $d$, $g$, $k$, $n$, $o$ additional lamps 15' are included in the appropriate electrical channels to represent the time required for interchange at these points that represent stations of interchange of the railway network.

The particular electrical maze shown in Fig. 2 is arranged for indication of the shortest route between the point $z$ and any of the points $a$ to $o$ inclusive. Thus the point $z$ of the electrical maze is connected to one terminal of a source of high voltage alternating electrical supply, typified by the secondary winding 16 of a stepup transformer 17, whose primary 18 may be connected to alternating electric mains. The several points $a$ to $o$ inclusive of the electrical maze are respectively connected to corresponding contacts of pressel or similar selector switches A to O inclusive. The remaining contacts of these selector switches A to O inclusive are all connected together and through throttling means in the form of a resistance 19 to the remaining terminal of the secondary winding 16 of the transformer 17.

If it is desired, not only to obtain indication of the shortest route between the point on the railway network represented by the point $z$ of the electrical maze and any other point of the railway network represented by one of the points $a$ to $o$ inclusive of the electrical maze, but also to obtain an approximate indication of the average time required for transit over this route, a high-resistance voltmeter 20 may be connected, as shown in Fig. 2 between the junction of the resistance 19 with the common point of switches A to O inclusive and the point $z$ so that this voltmeter indicates the voltage developed at any time across the electrical maze alone and excludes the voltage drop in the resistance 19. For this purpose, alternatively a milliammeter may be connected in series with the secondary winding 16, or a suitable ammeter may be connected in series with the primary winding 18, but such an arrangement has a lower degree of accuracy.

In a practical case the lamps 15 may be small tubular neon filled discharge lamps having an ignition voltage of about 200 volts; an extinction voltage of about 150 volts and operating safely with a current of about 1 milliampere. The transformer 17 should then be such that the peak voltage somewhat exceeds 200 multiplied by the number of lamps involved in representation of the shortest route between the two most distant points of the railway network. Quite high voltage may therefore be needed. Consequently the selector switches A to O inclusive should be such as adequately and safely to control the necessary high voltage.

When alternating electric supply is used, as shown in Fig. 2, the resistance 19 may, if desired, be substituted by a choke coil or condenser, that, having regard to the frequency of the supply, produces an adequate voltage drop when current flows through it.

In the operation of the device shown in Fig. 2 if it be desired that the shortest route between the point of the railway net-work corresponding to the point z of the electrical maze and any other point on the network, the one of the selector switches A to O inclusive, that pertains to the corresponding point on the electrical maze is closed manually. As the alternating voltage applied rises from zero in any half cycle, it reaches a value equal to the sum of the threshold or ignition voltages of the lamps included in the shortest route (minimum number of lamps) interconnecting the point z with the point of the maze corresponding to which a selector switch has been closed. Current then commences to flow through that route and the lamps comprised in it are illuminated. Further increase of the voltage of the transformer secondary winding 16 tends to cause more current to flow through the lamps that are already ignited, the voltage applied to the maze being maintained constant or nearly so at a value somewhat below that initially required to ignite the lamps. The excess voltage induced in the transformer secondary 16 is dissipated in the throttling resistance 19. Consequently a voltage sufficiently great to ignite the lamps of a route between the two points comprising more neon lamps than those already ignited cannot be applied to the electrical maze and therefore the lamps of the shortest route only are ignited. These ignited lamps are extinguished in the maze for the one-half cycle of the alternating supply, and are re-ignited during the waxing of the next subsequent half cycle so long as the appropriate switch is pressed.

Since the voltmeter 20 is connected across the maze only, its reading depends upon the number of lamps in series that are ignited in the shortest route through the maze from the point z to the actuated switch. Its reading may therefore be considered as a measure of the distance and therefore transit time by the shortest route through the railway network from the point represented by the point z of the electrical maze to the point of the railway network corresponding to the switch that has been actuated.

As has been explained, a high voltage is needed for operation of the arrangement shown in Fig. 2. The arrangement shown for two routes only in Fig. 3 may be employed to reduce the necessary peak voltage when an alternating electrical supply is used, and this arrangement also has other advantages.

As shown in Fig. 3, in one channel of the electrical maze, controlled by the switch A′, two glow lamps 15″ are individually coupled into the channels by means of impedance transforming devices that in this case take the form of electrical transformers 22 and 23. These transformers may have voltage transformation ratios of any suitable value so that the voltage developed in their primary windings is a fraction of that developed across their respective lamps 15″. Moreover the various transformers such as 22 and 23 may have different voltage transformation ratios so that lamps having similar characteristics may be used to represent different transit times.

If in such an arrangement as is shown in Fig. 2 there be between the point z and any other point two or more routes through the electrical maze comprising equal numbers of lamps, which of there routes will be illuminated in response to closure of any particular switch is a matter of pure chance, unless some form of bias in favour or against a particular route or routes is introduced. Such a bias may be introduced into any channel of the maze shown in Fig. 2 by including in that channel the secondary winding, developing a moderate or low voltage, of a transformer of which the primary is connected with the alternating source of supply, for example in parallel with the primary winding 18 of the transformer 17. A similar biassing arrangement is shown in Fig. 3.

In the channel shown in Fig. 3 that is controlled by the switch B′ three lamps 15‴ are coupled respectively by transformers 24, 25, and 26 into the channel. The secondary winding 27 of a biassing transformer 28 is however connected in series with the secondary winding of the transformer 26 and its lamp. The primary winding of the transformer 28 is connected with the source of alternating electric supply. If the transformer 28 be so connected that the electromotive force of its secondary winding is energized by the secondary winding of the transformer 26, ignition of the lamps associated with this channel will take place preferentially, and only the route comprising this channel will be illuminated.

When an alternating supply is utilized, as described with reference to Figs. 2 and 3, transient effects sometimes occur that result in partial illumination or flickering of the lamps associated with the channels not included in the shortest route between the point z of the maze and the point corresponding to which a switch has been closed. It is therefore preferred in most cases to employ continuous current for energization of a route-indicating device employing neon glow lamps.

To this end the point z and the end of the resistance 19 may be connected to a source of high voltage continuous current. However, where an alternating supply is available, a rectifying diode 29 may be connected, as shown in Fig. 4, with the secondary winding 16 of the transformer 17. The cathode of this diode 29 may be heated by connection with an additional secondary winding 30 of the transformer 17 in a conventional manner. The rectified output of the diode may be smoothed before application to the resistance by means of an additional series impedance 31 and shunt capacity 32.

It will be appreciated that certain specific forms of electrical route finding devices have been described with reference to and shown in the accompanying drawings by way of example only, and that many modifications may be made without departing from the scope of the invention.

What I claim is:

1. In a device for determining the shortest route from one point to a selected point among a plurality of routes between said points, a maze of electrically interconnected channels representing routes between a plurality of points and a plurality of routes between a plurality of pairs of points, an energy source and means for connecting said source simultaneously to apply energy to all of said channels which represent routes between the two desired points, a plurality of gas discharge tubes connected in each of said channels, the number thereof in any one channel depending upon the length of the route represented by that channel, said gas discharge tubes being operable to impede the flow of energy therethrough when the energy level is below a predetermined value but to freely conduct energy therethrough when the energy level is equal to or above said predetermined value, whereby energy sufficient to operate the gas discharge tubes will flow only through that channel comprised in said plurality of channels having the least number of tubes included therein to the exclusion of any of the remaining channels having a greater number of tubes included therein, and a meter connected in circuit with said energy source and all of said channels for indicating the magnitude of the energy consumed in the respective channels whereby the approximate travel time required to traverse the route corresponding to an energized channel may be indicated.

2. A route finding device comprising, a maze of electrically interconnected channels representing routes between a plurality of points and a plurality of routes between a plurality of pairs of points, a source of electrical energy having one side thereof connected to a point in said maze representing present position, a plurality of switches connected to a plurality of points representing destination positions and connected to the other side of said source whereby actuation of a selected one of said switches applies energy to all channels which may exist between the point representing present position and the point representing the destination position, and a plurality of gas discharge tubes in each of said channels, the number thereof in any one channel depending upon the length of the route represented by that channel, said tubes being operable to shunt energy therethrough only when energy of a sufficient magnitude is applied thereto to cause the tubes in the desired path to discharge whereupon the operation of the tubes in any other of the energized channels is thereafter prevented.

3. A device of the character set forth in claim 2 in which a pair of the channels representing routes between two points each has substantially the same number of gas discharge tubes included therein, and bias means coupled with one of said pair of channels for altering the energy level at which the tubes included in that one channel will operate.

4. In a device for determining the shortest route from one point to a selected point among a plurality of routes between said points, a maze of electrically interconnected channels representing routes between a plurality of points and a plurality of routes between a plurality of pairs of points, an energy source and means for connecting said source simultaneously to apply energy to all of said channels which represent routes between the two desired points, a plurality of gas discharge tubes connected in each of said channels, the number thereof in any one channel depending upon the length of the route represented by that channel, said gas discharge tubes being operable to impede the flow of energy therethrough when the energy level is below a predetermined value but to freely conduct energy therethrough when the energy level is equal to or above said predetermined value, whereby energy sufficient to operate the gas discharge tubes will flow only through that channel comprised in said plurality of channels having the least number of tubes included therein to the exclusion of any of the remaining channels having a greater number of tubes included therein, and means for indicating the magnitude of the energy consumed in the respective channels whereby the approximate travel time required to traverse said one channel may be indicated.

REGINALD FREDERICK HANSFORD.

REFERENCES CITED

The following references are of record in the file of this patent:

UNITED STATES PATENTS

| Number | Name | Date |
|---|---|---|
| 1,737,520 | Richardson | Nov. 26, 1929 |
| 2,204,315 | Levin | June 11, 1940 |

FOREIGN PATENTS

| Number | Country | Date |
|---|---|---|
| 635,128 | Great Britain | Apr. 5, 1950 |